(No Model.) 2 Sheets—Sheet 2.
F. A. CODY & L. T. LAWTON.
HYDROCARBON LIGHTING DEVICE.
No. 484,354. Patented Oct. 11, 1892.
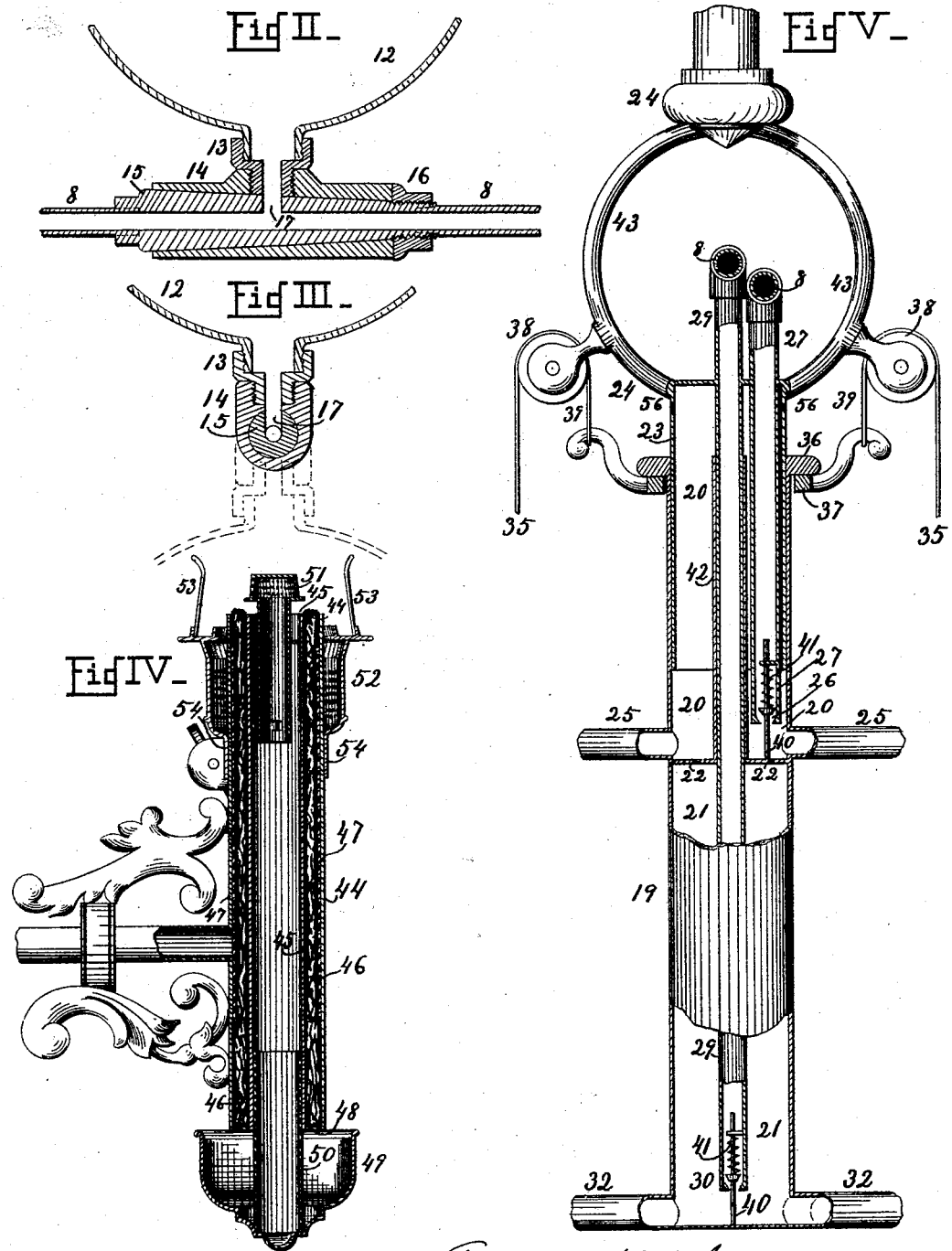
Witnesses,
P. E. Stevens.
In. C. Hillyard.
Inventors:
Frederick A. Cody
Lyman T. Lawton,
by W. K. Stevens. Atty.

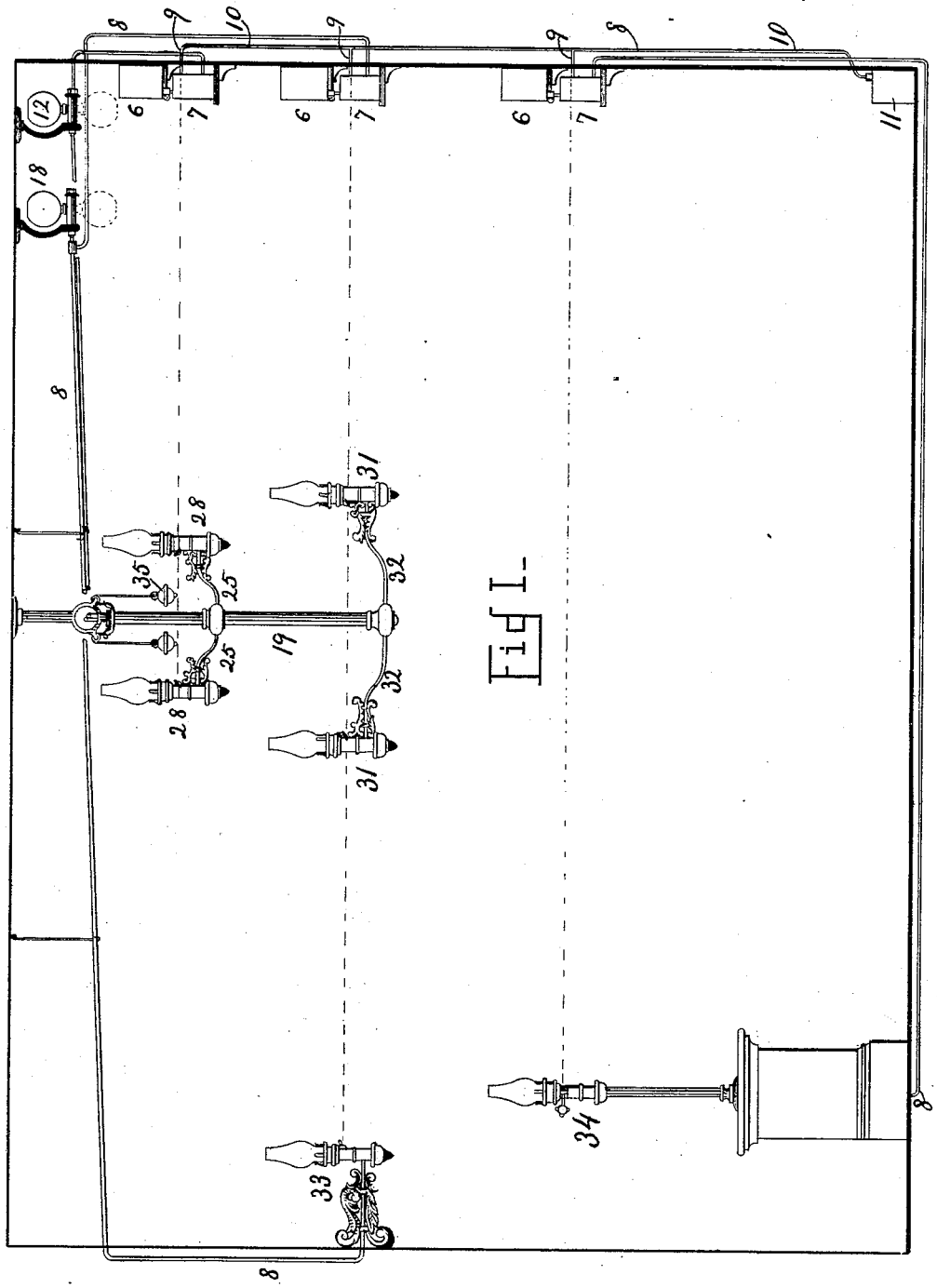

UNITED STATES PATENT OFFICE.

FREDERICK A. CODY AND LYMAN T. LAWTON, OF MERIDEN, CONNECTICUT, ASSIGNORS TO THE AMERICAN AUTOMATIC LIGHTING COMPANY, OF NEW JERSEY.

HYDROCARBON-LIGHTING DEVICE.

SPECIFICATION forming part of Letters Patent No. 484,354, dated October 11, 1892.

Application filed October 29, 1890. Serial No. 369,660. (No model.)

*To all whom it may concern:*

Be it known that we, FREDERICK A. CODY and LYMAN T. LAWTON, citizens of the United States, residing at Meriden, in the county of New Haven and State of Connecticut, have invented certain new and useful Improvements in Hydrocarbon-Lighting Devices; and we do hereby declare the following to be a full, clear, and exact description of the invention, such as will enable others skilled in the art to which it appertains to make and use the same.

This invention relates to that class of house-lighting devices by means of which a series of lamps, including chandeliers, bracket-lamps, and standing lamps, are supplied with kerosene-oil or other hydrocarbon running freely through pipes from air-tight reservoirs; and its object is, in general, to provide means whereby the oil may be steadily and automatically supplied to the lamps to secure perfect combustion, an even light, and safety, and, more in detail, first, to provide means for automatically entrapping any air which may accumulate in the supply-pipes and endanger a break in the circulation and for observing at any time the amount of air so entrapped; second, means for removing the entrapped air without disturbing the circulation of oil in the pipes; third, means for preventing the overflow of oil from the lamps when a chandelier is drawn down to be trimmed; fourth, to prevent accumulation of gas in the lamp and other minor objects, as will hereinafter more fully appear.

To this end the invention consists in the construction and combination of parts forming a "hydrocarbon-lighting device," hereinafter described and claimed, reference being had to the accompanying drawings, in which—

Figure I represents in outline a room provided with a chandelier a bracket-lamp, and a standing lamp, according to this invention. Fig. II represents one of these air-traps in vertical section longitudinal to the pipe. Fig. III represents the said trap in section transverse to the line of pipe in position for service, while in dotted lines the position of the trap is shown when inverted for removal of the air-tank. Fig. IV represents in vertical section one of these lamps peculiarly adapted for this system of lighting. Fig. V represents a portion of one of these chandeliers, partly in vertical section, the diameters and thickness of parts being enlarged out of due proportion for sake of this illustration.

6 represents a series of removable oil-cans provided each with only one outlet, which is located to deliver into the distributing-reservoir 7 below it, each reservoir being connected with the lamps of its level by distributing-pipes 8, and the overflow from all the reservoirs being conveyed by branches 9 and a common drip-pipe 10 to an oil-can 11, which is interchangeable with the cans 6.

12 represents the tank of the air-trap, consisting of a glass globe provided with a nozzle 13, fitted to be screwed air-tight into the sleeve 14 of a stop-cock, whose plug 15 is fixed to communicate permanently with a distributing-pipe 8.

16 is a tightening-nut for the stop-cock. It is known that in this system of lighting each distributing-reservoir must be fixed on a level with the lamps which it supplies and that overhead pipes communicating between each lamp and reservoir act on the siphon principle in delivering oil to the lamps. A priming-inlet, which is the subject of a former patent, is fixed at the highest point of each such siphon, and located at this inlet is an air-trap, because bubbles of air will rise to the highest accessible point in the oil-pipes, and thus naturally accumulate in the air-trap. The opening 17 of the plug 15 always remains upward, and through this the pipe may be filled with oil to prime it when the tank 12 is removed. Then the sleeve 14 may be turned around the plug as a stop-cock to the pipe. (See dotted lines, Fig. III.) Now the tank 12 should be filled with oil and then be screwed to place in the sleeve and finally be inverted to the normal position, as shown in full lines. Then communication with the pipe will be opened through inlet 17, and any air which may work into the pipe will rise through opening 17 into the tank and be replaced by the oil therein, thus preserving unbroken oil circulation in the pipe. The tank is made of glass or other transparent material, whereby the amount of oil remaining in it may at any time be seen, and when the air accumulated displaces all the oil the tank should be turned down and refilled, as described. The stop-cock being closed by said turning of its sleeve with the tank prevents the entrance of air at 17 and the loss of the priming. 18 represents a similar air-trap so located as to show that it is not essential to this invention that the feed-pipe 8 should have connection with both ends of the plug 15. So long as the plug 15 has connection with the highest point of the feed-pipe it will accomplish its purpose both as part of an air-trap and as a priming-inlet whether the oil enters one or both ends of the plug.

19 represents the body of a chandelier, consisting of a tube divided into two chambers 20 and 21 by a partition 22 and telescoping upon a tube 23, which is rigidly fixed to the hanger 24. The chamber 20 extends up into the tube 23 and receives oil through a valve 26 in a pipe 27, which depends from one of the supply-pipes 8 and delivers oil to lamps 28 through pipes 25. The chamber 21 is connected with the other supply-pipe 8 by means of a pipe 29, having a valve 30, and it supplies oil to the lamps 31 by means of pipes 32.

It will be seen that the lamps 28 have connection with the upper reservoir 7 only, while the lamps 31 of the chandelier and the bracket-lamp 33 are connected with the middle reservoir and the standing lamp 34 with the lower reservoir.

In order that the chandelier may be lowered to be trimmed, &c., the body portion 19 telescopes upon the body portion 23 and is supported by balance-weights 35 through the agency of a flange 36, projecting around the tube 23, a loose collar 37, on which the flange rests and turns freely, pulleys 38, journaled in brackets of the hanger 24, and cords or chains 39, passing over the said pulleys from ears of the said collar to the said weights. The valves 26 and 30 are provided with stems 40, adapted to push the valves open by coming in contact with the bottoms of the respective chambers 20 and 21 when the chandelier is raised to its normal position; but when the chandelier is lowered the valves are closed by springs 41, thus preventing a surplus of oil being delivered from the pipes 27 and 29 and preventing the lamps from overflowing, and, further, preventing ingress of air during the return movement of the chandelier. The pipe 29 fits loosely in tube 42 and the body portions 19 and 23 fit loosely together to permit air to draw in when the chandelier is lowered and to pass out again when the chandelier is returned. Otherwise suction would be produced one way and pressure the other, causing overflow of oil from the lamps. Air from chamber 21 will first pass out into chamber 20 and then escape into the open air, and holes 56 in the body 23 may further be provided to enlarge the air-passages.

The pipes 27 and 29 are fixed tightly in the top of chamber 20, and the pipe 29, which passes through the floor 22 of that chamber, is surrounded by a telescoping tube 42 to prevent leakage of oil between the chambers, so that the pipe 29 and the tube 23 slide within the tubes 42 and 19, respectively, while the pipe 27 is a fixture wholly within the tube 23 and has no sliding contact except with the oil in the chamber. We provide the hanger 24 with a ring 43, through which one or more pipes 8 may pass. We form the body of each lamp in this system of two concentric tubes 44 and 45 and a bottom 48, having only space for the wick 46 and the thin wick-carrying sleeve 47 between them. The thin tube 47 actually buries itself into the wick, so that the annular body of the lamp is entirely filled by the wick, and as fast as that is consumed and raised the space below is necessarily filled by oil, thus leaving absolutely no chamber or space in the lamp where air or explosive gas could accumulate. The chambers 20 and 21 are so far from the seat of combustion that the oil in them could not become sufficiently heated to evolve inflammable gas, and in any case they are inaccessible to flame, so that if there was any gas in them it could never be ignited.

49 is the usual drip-cup, attached to a perforated tube 50, which telescopes closely within yet admits air to the inner tube 45.

51 is a perforated air-distributer. 52 is the gallery which usually surrounds the burner below the wick to hold the glass chimney by means of spring-fingers 53 and to admit air to the outside of the flame through many fine perforations; but we provide this gallery with a sleeve 54 to telescope upon the tube 44, so that it may be removed for cleaning the cinder-droppings from the wick, thus avoiding the smoke from the burning of old cinders in the gallery when the lamp is lighted.

Having thus fully described our invention, what we believe to be new, and desire to secure by Letters Patent, is the following:

1. The combination, in a hydrocarbon-lighting device having a siphon-shaped conducting-pipe, of a stop-cock whose plug is connected with the said conducting-pipe at its highest point and whose sleeve is reversible on the plug and an air-tank removably connected with the reversible sleeve at the mouth thereof, substantially as described.

2. The combination of a hydrocarbon-distributing pipe and a stop-cock whose plug is connected with the highest portion of the pipe and provided with an outlet at its upper side and whose sleeve is fitted to rotate upon the plug and is provided with an outlet to register with the said outlet of the plug when the sleeve is in one position and to close the said outlet when in another position, substantially as described.

3. The combination of a hydrocarbon-distributing pipe and a transparent air-tank and oil-containing tank removably connected with its highest point, and means for closing the pipe against the entrance of air when the tank is removed, substantially as described.

4. The combination of a hydrocarbon-distributing pipe and a transparent air and oil containing tank provided with means for being refilled and of closing the pipe in the meantime, substantially as described.

5. The combination of a hydrocarbon-distributing pipe and a chandelier telescopically connected therewith, one of the telescoping pipes being provided with a flange and the other with a collar permanently supporting the flange and upon which the same may rotate, substantially as described.

6. The combination of a pendent hydrocarbon-distributing pipe, a chandelier-pipe fitted to telescope therewith and provided with a flange, a loose collar fitted freely beneath the said flange as a support therefor, and a balance-weight connected with the collar, substantially as described.

7. The combination of a hydrocarbon-distributing pipe, a hanger provided with a tube connected with the pipe, a chandelier having a tubular body portion fitted to telescope upon the aforesaid tube and provided with a flange, a collar loosely supporting the flange, pulleys journaled upon a fixture, and cords passing over the pulleys and supporting the said collar at one end and a balance-weight at the other end, substantially as described.

8. The combination of a chandelier provided with oil-compartments on different levels and lamps to each compartment, hydrocarbon-supply tanks located on each of the said levels, distributing-pipes connecting the several compartments with the tanks of their respective levels, a tube depending from a hanger and surrounding depending portions of the delivery-pipes and telescoping with the body of the chandelier, and a tube rising from the partition between compartments and telescoping with the supply-pipe of the lower compartment, substantially as described.

9. The combination of a hydrocarbon-distributing pipe connected with a supply-reservoir and having a pendent fixed end, a chandelier provided with a receptacle fitted telescopically upon the said end and connected permanently therewith and supported thereby, and a valve in the said fixed pipe provided with a stem adapted to be engaged by the bottom of the said receptacle to be opened by the raising thereof and to be closed by the lowering thereof, whereby the chandelier may be lowered for trimming, &c., without permitting oil to flow from the supply-pipe.

10. The combination of a chandelier having a telescoping body, a hanger supporting one of the telescoping members, a flange and collar forming a portion of the connection between the other member and the hanger, and hydrocarbon-distributing pipes passing through the hanger into the chandelier, substantially as described, whereby the second member and its appurtenances may rotate freely around the first and the pipes therein.

In testimony whereof we affix our signatures in presence of two witnesses.

FREDERICK A. CODY.
LYMAN T. LAWTON.

Witnesses:
AUGUST SCHMELZER,
GEO. A. HILL.